US010093584B2

(12) United States Patent
Singh et al.

(10) Patent No.: US 10,093,584 B2
(45) Date of Patent: Oct. 9, 2018

(54) SILICON-BASED POLYMER-DERIVED CERAMIC COMPOSITES COMPRISING H-BN NANOSHEETS

(71) Applicant: Kansas State University Research Foundation, Manhattan, KS (US)

(72) Inventors: Gurpreet Singh, Manhattan, KS (US); Lamuel David, Knoxville, TN (US)

(73) Assignee: Kansas State University Research Foundation, Manhattan, KS (US)

( * ) Notice: Subject to any disclaimer, the term of this patent is extended or adjusted under 35 U.S.C. 154(b) by 98 days.

(21) Appl. No.: 15/323,885

(22) PCT Filed: Jul. 8, 2015

(86) PCT No.: PCT/US2015/039529
§ 371 (c)(1),
(2) Date: Jan. 4, 2017

(87) PCT Pub. No.: WO2016/007612
PCT Pub. Date: Jan. 14, 2016

(65) Prior Publication Data
US 2017/0144935 A1    May 25, 2017

Related U.S. Application Data

(60) Provisional application No. 62/021,956, filed on Jul. 8, 2014.

(51) Int. Cl.
*H01M 4/02*   (2006.01)
*C04B 35/571*  (2006.01)
(Continued)

(52) U.S. Cl.
CPC .......... *C04B 35/571* (2013.01); *C04B 35/583* (2013.01); *C04B 35/589* (2013.01);
(Continued)

(58) Field of Classification Search
CPC ....................................................... H01M 4/02
See application file for complete search history.

(56) References Cited

U.S. PATENT DOCUMENTS

2005/0159293 A1*  7/2005  Wan .................... B01D 71/024
                                                    501/87
2007/0142203 A1   6/2007  Malenfant et al.
(Continued)

FOREIGN PATENT DOCUMENTS

WO   2010141432   12/2010
WO   2013119806    8/2013
WO   2013158741   10/2013

OTHER PUBLICATIONS

The International Search Report and Written Opinion dated Oct. 8, 2015, in PCT/US15/39529 filed Jul. 8, 2015.
(Continued)

*Primary Examiner* — Jacob Marks
(74) *Attorney, Agent, or Firm* — Hovey Williams LLP

(57) ABSTRACT

Polymer-derived ceramic composites are described herein. The composites are formed using hexagonal boron nitride nanosheet-functionalized silicon-based ceramic precursor polymers. The composites a matrix of a polymer-derived ceramic and hexagonal boron nitride nanosheets embedded therein. Silicon-derived ceramic precursors such as polysilazane and/or polysiloxane are used to create improved SiCN and/or SiOC ceramic composites.

18 Claims, 10 Drawing Sheets

(51) Int. Cl.
    *C04B 35/583* (2006.01)
    *C04B 35/589* (2006.01)
    *C08J 3/24* (2006.01)
    *H01M 4/136* (2010.01)
    *H01M 4/58* (2010.01)
    *H01M 4/66* (2006.01)
    *H01M 10/0525* (2010.01)

(52) U.S. Cl.
CPC .............. *C08J 3/24* (2013.01); *H01M 4/136* (2013.01); *H01M 4/58* (2013.01); *H01M 4/661* (2013.01); *H01M 10/0525* (2013.01); *C04B 2235/386* (2013.01); *C04B 2235/483* (2013.01); *C08J 2383/04* (2013.01); *C08J 2383/16* (2013.01); *H01M 2004/027* (2013.01); *H01M 2220/20* (2013.01)

(56) References Cited

U.S. PATENT DOCUMENTS

2015/0069288 A1    3/2015    Hong et al.
2015/0099078 A1    4/2015    Fish

OTHER PUBLICATIONS

David, Lamuel, "Facile Synthesis and High Rate Capability of Silicon Carbonitride/Boron Nitride Composite with a Sheet-Like Morphology," The Journal of Physical Chemistry, Jan. 13, 2015, pp. 2783-2791, vol. 119.
David, L, "Polymer-Derived Ceramic Functionalized $MoS_2$ Composite Paper as a Stable Lithium-Ion Battery Electrode," Science Reports, Apr. 8, 2015, vol. 5.

\* cited by examiner

SILICON-BASED POLYMER-DERIVED CERAMIC COMPOSITES COMPRISING H-BN NANOSHEETS

CROSS-REFERENCE TO RELATED APPLICATIONS

The present application is the National Stage of International Patent Application No. PCT/US2015/039529, filed Jul. 8, 2015, which claims the priority benefit of U.S. Provisional Patent Application Ser. No. 62/021,956, filed Jul. 8, 2014, entitled SYNTHESIS AND HIGH RATE CAPABILITY OF SILICON CARBONITRIDE H-BN SHEET-LIKE COMPOSITE, each of which is incorporated by reference in its entirety herein.

FEDERALLY SPONSORED RESEARCH OR DEVELOPMENT

This invention was made with government support under grant #1335862 awarded by the National Science Foundation. The government has certain rights in the invention.

BACKGROUND OF THE INVENTION

Field of the Invention

The present invention relates to improved polymer-derived ceramic composites and methods of making and using the same.

Description of Related Art

Powering of electric vehicles or next generation wearable electronic devices that run on Li-ion battery (LIB) technology will require new electrode materials beyond the traditional graphite anode because of its poor rate capability and low charge capacity (theoretical charge capacity approx. 372 mAh·g−1), which has already been realized. Therefore, desired characteristics of an advanced LIB system are high power and energy density, safety, long-life, and lightweight. Recent research has shown that Si anodes can drastically increase the capacity of existing LIB by more than 30%. However, Si suffers from huge volume changes during charge/discharge cycles and has poor electrical conductivity that generally leads to poor rate capability.

Polymer-derived ceramics, such as silicon carbide (SiC), siliconoxycarbide (SiOC), silicon carbonitride (SiCN), aluminum nitride (AlN), and hafnium carbide (HfC), can be synthesized by thermal decomposition of suitable polymeric precursors, and possess some remarkable properties, such as high oxidation resistance, high temperature piezoresistivity, high mechanical strength, and photoluminescence. One advantage of polymer-derived ceramics is that their microstructure can be modified on a molecular scale through modification of the polymer precursor. Most silicon-based polymer-derived ceramics are amorphous ceramics, prepared by controlled heating of polysilazane- or polysiloxane-based liquid polymeric precursors. The final ceramic's chemical and physical properties are known to depend on the initial molecular arrangement of the polymeric precursor and processing conditions. Numerous engineered Si nanomaterial like nanowires, nanoparticles and hollow nanospheres have shown promising results in laboratory experiments, however, a practical and cost-effective solution is yet to be realized.

SUMMARY OF THE INVENTION

The present invention is broadly concerned with improved polymer-derived ceramic composites. The ceramic composites comprise a matrix of a polymer-derived ceramic (e.g., SiCN and/or SiOC) and hexagonal boron nitride nanosheets embedded therein.

Articles of manufacture or other structures are also described herein, including structures comprising a substrate having a surface and a layer of a polymer-derived ceramic composite adjacent the substrate surface. The polymer-derived ceramic composite comprises a matrix of polymer-derived ceramic (e.g., SiCN and/or SiOC) and hexagonal boron nitride nanosheets embedded therein.

Pre-ceramic composites are also described herein. The pre-ceramic composites comprise a crosslinked matrix of silicon-based ceramic precursor compounds (e.g., polysilazane and/or polysiloxane) and hexagonal boron nitride nanosheets. Preferably, the hexagonal boron nitride nanosheets are embedded substantially uniformly throughout the crosslinked matrix.

Also described herein are methods of forming polymer-derived ceramic coatings. The methods generally comprise dispersing a ceramic composite powder in a solvent system to form a ceramic dispersion. The powder comprises discrete particulates, each of which comprises a matrix of polymer-derived ceramic (e.g., SiCN and/or SiOC) and hexagonal boron nitride nanosheets embedded therein. The ceramic dispersion is applied to a substrate surface to form a layer thereon. The layer is then heated to at least a boiling point of the solvent system (i.e., to evaporate the solvent system and "set" the coating) to yield a coated substrate having the ceramic composite coating adjacent the substrate surface.

Methods of forming a polymer-derived ceramic are also described herein. The methods generally comprise providing a functionalized precursor compound mixture comprising a liquid-phase, silicon-based ceramic precursor compound and hexagonal boron nitride nanosheets. The functionalized precursor compound is crosslinked to yield a pre-ceramic composite comprising a crosslinked matrix of the silicon-based ceramic precursor compound and hexagonal boron nitride nanosheets. The silicon-based ceramic precursor compound is converted to ceramic to yield a ceramic composite comprising a polymer-derived ceramic matrix and hexagonal boron nitride nanosheets embedded therein. This technique can be used to mold or cast shaped parts out of the inventive polymer-derived ceramic composite.

The present polymeric precursors and resulting ceramic composites have a multitude of uses. Thus, in one or more embodiments, a lithium ion battery electrode is provided, which comprises a ceramic composite according to any one (or combination of) the various embodiments described herein. The lithium ion battery electrode comprises a non-metallic conductive substrate (e.g., rGO); and a ceramic composite layer adjacent the conductive substrate, the ceramic composite comprising a matrix of a polymer-derived ceramic and hexagonal boron nitride nanosheets embedded therein, wherein the polymer-derived ceramic is selected from the group consisting of SiCN, SiOC, and combinations thereof. Preferably, the electrode is an anode for a lithium ion battery. Advantageously, use of the present nanocomposites eliminates the need for separate conducting material (e.g., copper) in the electrode structure. The electrode is preferably substantially free of binder, conductive additives, and current collector metal (e.g., copper).

Another advantage of the invention is that SiCN/BN shows several orders of magnitude higher electrical conductivity than SiCN or BN alone or any other boron-doped SiCN described in the literature. Thus, in one or more embodiments, the invention also concerns a powdered composition comprising a plurality of free-flowing particulates, each of the particulates consisting of ceramic composites comprising a matrix of polymer-derived ceramic and hexagonal boron nitride nanosheets embedded therein, wherein the polymer-derived ceramic is SiCN. Advantageously, the powdered composition has a four-point electrical conductivity of at least 0.115 S/cm, as demonstrated in the working examples.

DETAILED DESCRIPTION

Figure 1:
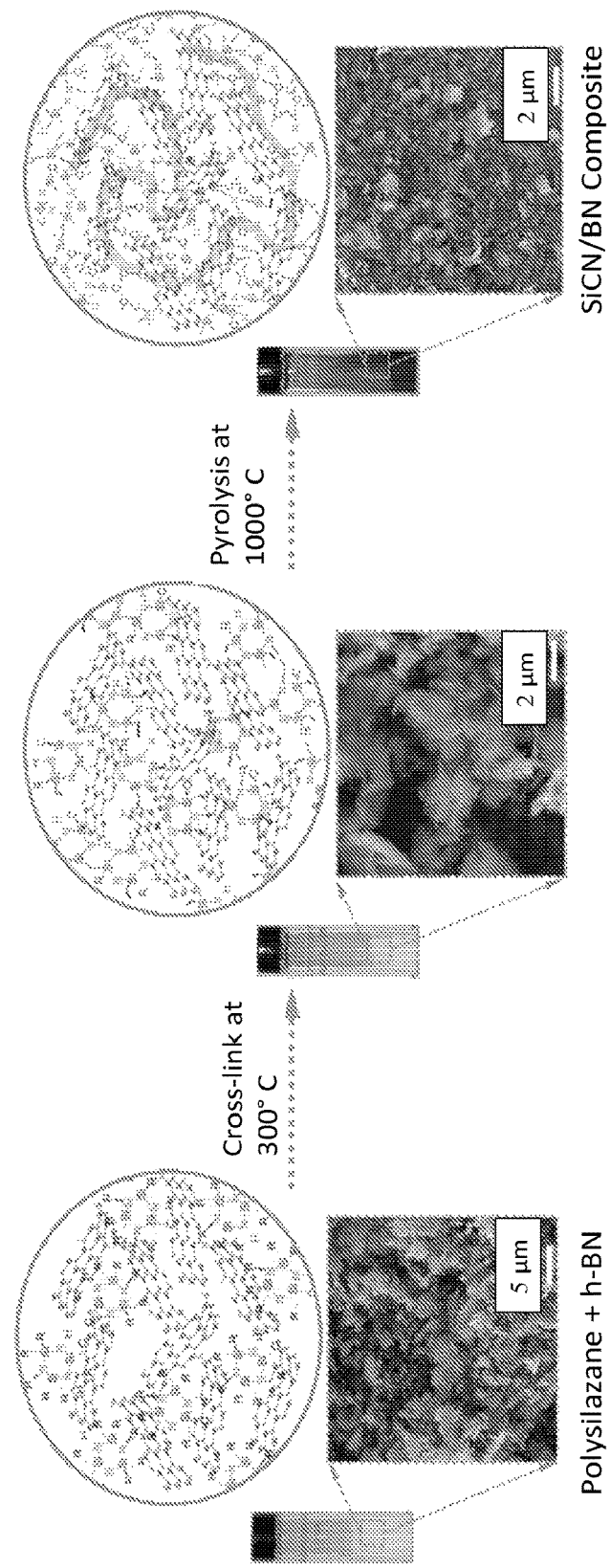
FIG. 1 is a schematic showing polymer to ceramic conversion and simultaneous incorporation of BN sheets in a SiCN matrix. (L to R): polysilazane precursor uniformly wets BN sheets when they are stirred together. As the mixture is heated in flowing $N_2$, polysilazane cross-links at approximately 300° C. to form long chains connected by BN sheets. Further pyrolysis at 1000° C. forms BN sheets embedded with SiCN ceramic matrix. Inset shows SEM images of the composite at various stages of processing.

In one or more embodiments, the present invention is concerned with new polymer-derived ceramic precursors, and polymer-derived ceramics and composites formed therefrom. The methods comprise mixing a room temperature liquid-phase, silicon-based ceramic precursor compound with crystalline boron nitride, and particularly hexagonal boron nitride ("h-BN") sheets (aka nanosheets). The precursor compound and h-BN are preferably mixed for at least about 12 hours (preferably from about 12 to about 48 hours, with continual mixing) under ambient conditions. The term "ambient conditions," as used herein, refers to the common, prevailing, and uncontrolled conditions in a room or place, such as room temperature (about 20-35° C.) and normal atmosphere and pressure (about 1 atm), and without artificial constraints. In other words, formation of the reaction mixture according to the invention does not have to be carried out under any elevated temperatures or pressures, or in an otherwise artificial environment (e.g., under vacuum, under Ar or $N_2$ gas, etc.). In some embodiments, the reaction mixture may be heated during mixing to temperatures of from about 25° C. to about 85° C. to facilitate drying of any solvent (if present, see infra), as well as evaporation of any by-products, although the reaction otherwise proceeds under ambient conditions. In some embodiments, sonication can be used to facilitate intermixing of the ingredients to create a substantially homogenous reaction mixture, with h-BN nanosheets substantially uniformly dispersed in the polymer. Unlike traditional composite materials, the present materials involve surface wetting and functionalization of the h-BN by the liquid precursor compound resulting in a chemical interfacing between the h-BN nanosheets and the silicon-based ceramic precursor compound.

Hexagonal boron nitride suitable for use in the invention includes the compound in any solid form or crystal size. In general, h-BN consists of layered sheets held together by van der Waals forces that can stably exist with or without substrate support. Each h-BN sheet is composed of boron and nitrogen atoms alternatively positioned in the planar hexagonal crystal structure. The interlayer structure of h-BN is such that the boron and nitrogen atoms in adjacent layers eclipse one another due to the polarity of the two atoms, forming so-called AB stacking. Monolayered sheets have only one layer of atoms, whereas few-layered sheets are two-dimensional materials with two or more layers of atoms. The typical forms of h-BN include but are not limited to powder or single-crystal. The typical crystal size of h-BN powder ranges from nanometer to tens of microns. The term "nanosheet" is used herein to indicate that the crystalline structure has a sheet-like morphology having at least one planar dimension. In general, the average sheet thickness will range from about 1 nm to about 200 nm. h-BN nanosheets are commercially available from various sources.

Preferably, the silicon-based precursor compound is selected from the group consisting of silazanes, siloxanes, and combinations thereof. More preferably, oligomeric or polymeric silazanes and/or siloxanes are used in the invention, where the term "polymer" will be used herein to encompass both oligomers and polymers. The term "room temperature liquid-phase" as used herein, means that the polymer is a flowable, liquid-phase material, without the aid of solvents or heating to soften the material and/or lower its viscosity. Thus, such materials are in the liquid-phase (as opposed to the gel, semi-solid, or soft-solid phases) at or about room temperature (e.g., from about 20 to about 35° C.), and in any event at temperatures below 50° C. Thus, in some literature, such polymers are described as 100% "solids" polymers (i.e., not dispersed in a solvent) in the liquid phase, which can be solidified (cured) under appropriate conditions upon heating to sufficient temperatures.

Suitable silazanes for use in the various embodiments include any type of polysilazane, including functional derivatives thereof. For example, many commercially-available polysilazanes include functional groups, such as methyls, vinyls, aryls, alkyls, allyls, amines, phenyls, and the like, pendant from the backbone to improve stability of the polymer and/or facilitate crosslinking/curing. Exemplary polysilazanes will generally comprise (consist essentially, or even consist of) monomeric repeat units comprising (consisting essentially or even consisting of) alternating silicon and nitrogen atoms in the polymer backbone. In one or more embodiments, the monomeric repeat units comprise (consist essentially or even consist of) alternating silicon and nitrogen, generally of the formula:

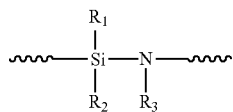

where each of $R_1$ and $R_2$ are individually —H, alkyls (e.g., $C_1$-$C_4$ alkyls), alkenyls (e.g., vinyl groups, etc.), or alkynls (e.g., —C≡CH), and $R_3$ is —H, alkyl, aryl, or allyl. The foregoing segment may correspond to one monomeric repeat unit in the polymer backbone, but may also represent a portion of the backbone smaller than an entire repeat unit where additional atoms are attached to either the nitrogen or the silicon within the repeat unit, as indicated by the squiggly lines. Thus, the squiggly line indicates the point of attachment to the remainder of the backbone or molecule. The foregoing segment may also represent a repeat segment of a cyclic polymer, with repeating Si—N units forming a ring, as illustrated below:

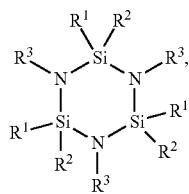

where $R_1$, $R_2$, and $R_3$ are defined above.

In some embodiments, additional atoms, such as alternating carbons, can be present in the backbone of the Si—N repeat unit ("organopolysilazanes" or "polycarbosilazanes"), or in adjacent repeat units. Thus, in one or more embodiments, the monomeric repeat units will comprise (consist essentially or even consist of) the general formula:

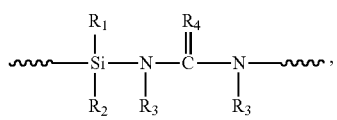

where $R_1$, $R_2$, and $R_3$ are defined above, and $R_4$ is O or S. In one or more embodiments, at least one of $R_3$ is —H. Thus, in some embodiments, suitable polysilazanes will comprise (consist essentially or even consist of) monomeric repeat units of:

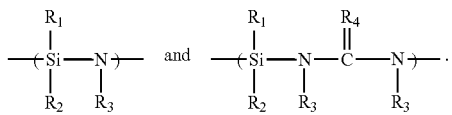

Polysilazanes are commercially-available (e.g., Ceraset™ from KiON, Clariant, etc.), and can also be synthesized using numerous known techniques. Various polysilazane synthesis routes are described, for example, in U.S. Pat. Nos. 5,021,533 and 5,190,709, incorporated by reference herein to the extent not inconsistent with the present disclosure.

Exemplary polysiloxanes will comprise (consist essentially or even consist of) monomeric repeat units of:

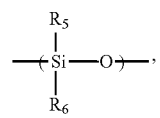

where each of $R_5$ and $R_6$ are individually —H, alkyls (e.g., $C_1$-$C_4$ alkyls), aryl (e.g., phenyl), or allyl. The general synthesis method for the preparation of polysiloxanes comprises the reaction of chloro (organo) silanes with water. A wide variety of polysiloxanes are also commercially available from various sources.

Regardless of the embodiment, a reaction mixture of silicon-based precursor compound and h-BN is formed. The relative amounts of silicon-based precursor compound and h-BN in the mixture is tunable, and can be varied depending upon the final properties desired in the polymeric precursor composition. In general, the weight ratio of silicon-based precursor compound to h-BN will range from about 1:9 to about 9:1, preferably from about 3:2 to about 9:1, more preferably from about 7:3 to about 9:1, and even more preferably about 17:3.

In one or more embodiments, the reaction mixture comprises, consists essentially, or even consists of silicon-based precursor compound and h-BN. In some embodiments, solvents may be present in the reaction mixture. In general, suitable solvent systems will include a solvent selected from the group consisting of alcohols (e.g., isopropanol), toluene, other organic solvents, and mixtures thereof. In some embodiments, the reaction mixture is substantially free (less than about 0.5% by weight) of any additives or additional ingredients, such as solvents, reaction salts, and the like. Reaction of the silicon-based precursor compound and h-BN results in a noncovalent functionalization of the precursor compound. In particular, the liquid precursor compound preferably wets the h-BN sheets, such that the silicon-based precursor compound and h-BN are substantially uniformly intermixed in the reaction mixture. Advantageously, the functionalized precursor compound mixture formed according to the present invention remain in liquid phase under ambient conditions. That is, the composition does not gel or harden into self-sustaining, semi-solid, or soft-solid phases at room temperature, where the term "self-sustaining" means that the gel or semi-solid is not susceptible to deformation merely due to its own internal forces, and substantially maintains its shape without an external support structure. Thus, the functionalized precursor compounds according to embodiments of the invention remains flowable polymer liquids under ambient conditions and are particularly suited for injection molding, liquid casting, fiber drawing, melt spinning, and/or infiltration/impregnation techniques. For example, the functionalized precursor compound can be poured, spin coated, spray coated, injected, puddle, pressed, and the like (without first being dispersed in a solvent system), which provides significant advantages over the state of the art.

The functionalized precursor compound mixture can then be crosslinked to yield a pre-ceramic composite. In particular, the functionalized precursor compound mixture can be heated to a temperature of from about 700 to about 1500° C. (preferably from about 900 to about 1100° C.) for about 120 to about 720 min (preferably from about 240 to about 360 min) at a rate of from about 2 to about 10° C./min. (preferably about 5° C./min.). Crosslinking can take place under artificial atmosphere (e.g., $N_2$ or $NH_3$) if desired. Crosslinking transforms the functionalized precursor compound liquid mixture into a solid pre-ceramic composite. The resulting pre-ceramic composite is a free-flowing (dry) white powder, wherein the individual particulates each comprise (consists essentially, or even consists of) a crosslinked network of the silicon-based precursor compound and h-BN sheets. As used herein, the term "free-flowing" means that the individual particulates remain loose with the ability to readily flow in response to shear forces, and do not have a tendency to cake or lump together into agglomerates. It will be understood that each particulate of the resulting powder is, individually, a silicon-based ceramic precursor/BN composite. The average (mean) particle size is from about 0.5 to about 10 µm, where the term "particle size" refers to the maximum surface-to-surface dimension of the particle. The particulates have a sheet-like morphology. The average thickness of the planar dimension of the sheet-like particulates is from about 0.01 to about 0.2 µm. In general, the weight ratio of silicon-based precursor compound to h-BN will range from about 1:9 to about 9:1, preferably from about 3:2 to about 9:1, more preferably from about 7:3 to about 9:1, and even more preferably about 17:3.

The pre-ceramic composite can be converted to a ceramic composite having improved properties. Ceramic formation requires pyrolyzing by heating the pre-ceramic composite up to at least about 700° C., and preferably at least about 1000° C., for at least about 2 hours (preferably from about 4 to about 12 hours), at a rate of from about 2 to about 10° C./min. (preferably about 5° C./min.) to yield a ceramic composite. Pyrolysis can take place under artificial atmosphere (e.g., $N_2$ or $NH_3$) if desired. It will be appreciated that the pyrolysis temperature can be varied depending upon the final desired properties of the ceramic composite. For most ceramic applications, the pre-ceramic composite can be heated to temperatures of between about 800° C. and 1100° C. for pyrolysis. For use as anodes in lithium ion batteries, temperatures between about 800° C. and 1000° C. are preferred. If a lower oxygen content in the final ceramic is desired, the precursor can be heated up to about 1500° C. The resulting ceramic composite is a free-flowing (dry) black powder, wherein the individual particulates comprise (consist essentially or even consist of) a polymer-derived ceramic matrix with h-BN sheets embedded therein. The h-BN sheets are preferably substantially uniformly dispersed throughout the matrix. The polymer-derived ceramic for use as the matrix is preferably selected from the group consisting of SiCN, SiOC, and combinations thereof. The ceramic composite particles have a sheet-like morphology, with an average thickness of from about 0.01 to about 0.2 µm. In general, the weight ratio of polymer-derived ceramic to h-BN will range from about 1:9 to about 9:1, preferably from about 3:2 to about 9:1, more preferably from about 7:3 to about 9:1, and even more preferably about 17:3.

The pre-ceramic composite and ceramic composites are both preferably substantially free of any fillers or additives, such as carbon nanotubes, nanoparticles, carbon fibers, graphene, molybdenum disulfide, fullerenes, and the like. The term "substantially free" as used herein means that the ingredient is not intentionally added or part of the composition, although it is recognized that residual or incidental amounts or impurities may be present in low amounts (e.g., less than about 0.5% by weight and preferably less than about 0.1% by weight, based upon the total weight of the composite taken as 100% by weight).

The fact that the functionalized precursor compound mixture is in the liquid phase (without the aid of any solvents or heat) expands the potential uses for these improved materials. For example, the functionalized precursor compound mixture can be applied to a substrate surface, such as by spray coating or spin coating, followed by curing and eventual pyrolysis to form a ceramic coating or film on the substrate surface. More preferably, the liquid functionalized precursor compound mixture can be cast or molded into the desired shape, followed by crosslinking and pyrolysis into ceramic. Thus, ceramic bricks or tiles could be made. Likewise, various-shaped ceramic parts can be fabricated as desired.

Similarly, the ceramic composite powder can also be used to create improved ceramic coatings. The ceramic composite powder can be dispersed in a solvent system. In general, suitable solvent systems will include a solvent selected from the group consisting of alcohols (e.g., isopropanol), toluene, other organic solvents, and mixtures thereof. This ceramic dispersion can then be applied to a substrate surface, such as by spraying, puddling, spin coating, brushing, or the like. The coating can then be heated to drive off solvents and "set" the coating. Thus, the heating temperature will depend upon the boiling point of the particular solvent system used. In general, the layer can be heated to temperatures ranging from about 60 to about 100° C., for time periods of from about 30 min. to about 24 hours. The process yields an improved ceramic composite coating adjacent the substrate surface. The coating can be laid down in various thicknesses, as desired. In general, the amount of ceramic composite particles present in the dispersion will be at least about 5% by weight, and preferably from about 10 to about 20% by weight, based upon the total weight of the dispersion taken as 100% by weight.

The ceramic composite powder can be applied to virtually any type of substrate including planar substrates as well as those having rough or intricate geometries (e.g., curved surfaces). Suitable substrates include metallic and non-metallic surfaces, such as those found in engine parts, tubing, wires, pump shafts, cylinders, spindles and/or sleeves, induction coils, natural and/or synthetic woven and/or nonwoven fibers, mats and/or cloth, paper (e.g., GO paper), and the like. Such ceramic coated paper composites be used as an independent anode material in rechargeable lithium-ion batteries. The inventive composite simplifies the anode design by eliminating the binder, conductive additives, and current collector metal (e.g., copper).

Such techniques would also be useful for the formation of various articles of manufacture, such as harsh environmental or high temperature sensors, turbine blades, microelectronic components, solar cells, electrodes, protective coatings, and the like. Exemplary metallic substrates include metals selected from the group consisting of copper and alloys thereof. The ceramic composite also has high optical absorbance characteristics, making ideal for applications involving optical absorbance. The ceramic composite layer is also resistant to laser irradiation, which makes it ideal for use in laser welding. It has been shown to absorb laser light without damage, and when applied to a metal substrate, can be used to direct heat to the metal substrate for welding. The term "resistant to damage" means that the ceramic will not burn, delaminate, or deform. Moreover, it will be appreciated that the powder itself can be used as a filler for a further composite material.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods in accordance with the invention. It is to be understood, however, that these examples are provided by way of illustration and nothing therein should be taken as a limitation upon the overall scope of the invention.

Example 1

Materials and Instrumentation

Boron nitride (99.9%) was purchased from Sigma Aldrich. Poly (ureamethylvinyl)silazane (Ceraset™) was obtained from Clariant corporation. All materials were used as received without further purification.

Scanning electron microscopy (SEM) of the synthesized material was carried out on a Carl Zeiss EVO MA10 system with incident voltage of 5 KV to 30 KV. TEM images were digitally acquired by use of a Phillips CM100 operated at 100 KV. The surface chemical composition was studied by X-ray photoelectron spectroscopy (XPS, PHI Quantera SXM) using monochromatic Al Kα X-radiation. $^{11}$B MAS NMR spectra were recorded at 11.7 T on a Bruker Avance500 wide-bore spectrometer operating at 160.47 MHz, using a Bruker 4 mm probe and a spinning frequency of the rotor of 12 kHz. Spectra were acquired using a spin-echo θ-τ-2θ pulse sequence with θ=90° to overcome problems of probe signal. The τ delay (83 μs) was synchronized with the spinning frequency and recycle delay of 1 s was used. Chemical shifts were referenced to $BF_3(OEt)_2$ (δ=0 ppm). The FTIR spectra were collected using Thermo-Nicolet Nexus 870FT-IR spectrometer. FTIR samples were prepared by mixing ~1 wt % of the finely powdered sample with FTIR grade KBr powder. The phase evolution was characterized by using Bruker powder X-ray diffractometer (Madison, Wis.) operating at room temperature, with CuKα radiation and nickel filter. The pyrolyzed samples were finely crushed with mortar and pestle and laid on the palette for analysis. Thermogravimetric analysis was performed using Shimadzu 50 TGA (Columbia, Md.) (limited to 1000° C.). Sample weighing, ~2.5 mg, was heated in a platinum pan at a rate of 10° C. $min^{-1}$ in air flowing at 20 mL·$min^{-1}$. Raman spectra were measured using a LabRAM ARMIS Raman spectrometer using 633 nm laser excitation (laser power of 17 mW) as the light source.

Preparation of SiCN/BN, SiCN/BNF, SiCN/BP

SiCN/BN: The chemical modification of Polyureasilazane (commercial name: Ceraset™) was performed using commercially obtained BN nanosheets (Sigma Aldrich™). Thus, 1 g of BN was mixed with 10 mL of polyureasilazane and stirred for 12 h at room temperature. Subsequently the mixture was cross-linked at 250° C. (heating rate 100° C. $h^{-1}$) for 180 min to obtain a white powder. The cross-linked polysilazane was then pyrolyzed in $N_2$ atmospheres at 1000° C. to yield an amorphous black colored powder. This sample is termed as SiCN/BN.

SiCN/BNF and SiCN/BP: Other modification of polyureasilazane with boron involved addition of either cross-linked BN polymeric precursor or commercially obtained boron powder from Sigma Aldrich™. The pyrolysis process was performed in a manner similar to SiCN/BN. These specimens were termed as SiCN/BNF and SiCN/BP, respectively.

Preparation of Paper Electrode 10 mL colloidal suspension of graphene oxide ("GO") in 1:1 (v/v) water was made by sonication for 10 minutes. GO was synthesized using Hummer's method. To this solution 60 wt % active material (SiCN/BN, SiCN/BNF or SiCN/BP) in 10 mL of isopropanol (ISP) was added and the solution was further sonicated for 60 min. Once the composite suspension was made it was filtered by vacuum filtration though a 10 μm filter membrane. Composite paper obtained was carefully removed from the filter paper and dried. This dry paper then underwent reduction by heat treatment in a tube furnace at 500° C. under argon atmosphere for 2 h. The thermal reduction process results in conversion of GO to rGO with approx. 50 to 60% weight loss. The pyrolyzed composite papers consisted of approx. 20 wt. % rGO.

Coin-Cell Assembly

Half-cell batteries were made by punching 14.3-mm diameter circles out of the paper for use as working electrode. A few drops of electrolyte solution of 1M $LiPF_6$ (Alfa Aesar™) dissolved in (1:1 v/v) dimethyl carbonate: ethylene carbonate (ionic conductivity 10.7 mS·$cm^{-1}$) was used. A 19 mm diameter glass separator, soaked in electrolyte was placed between the working electrode and pure lithium metal (14.3 mm diameter), which acted as a counter electrode. Washer, spring and a top casing were placed on top to complete the assembly before crimping. The whole procedure was carried out in an Ar-filled glovebox.

Electrochemical performance of the assembled coin cells was tested using a multichannel BT2000 Arbin™ test unit sweeping between 2.5 V to 10 mV vs Li/Li$^+$ using following cycle schedule: (a) Asymmetric mode: Li was inserted at 0.1 A g$^{-1}$ (w.r.t. weight of the active material), while the extraction was performed at increasing current densities of 100, 200, 400, 800, 1600 and 2400 mA g$^{-1}$ for 5 cycles each, and returning back to 100 mA g$^{-1}$ for the next 10 cycles. (b) Symmetric mode: Later, all the cells were subjected to symmetric cycling at a current density of 1600 mA g$^{-1}$ for up to 1000 cycles, returning back to 100 mA g$^{-1}$ for the last 20 cycles.

Results and Discussions

Synthesis and Characterization

Schematic in FIG. 1 describes the reaction mechanism involved in introduction of BN sheets in SiCN matrix. Vigorous physical mixing of few-layer thick boron nitride (BN) sheets with liquid polysilazane results in its non-covalent functionalization, which upon cross-linking at 300° C. forms polysilazane/BN polymer matrix composite. On further heating in N$_2$ at 1000° C., the polysilazane transforms to SiCN with evolution of H$_2$, CH$_4$, NH$_3$ etc. forming SiCN/BN composite with a layered morphology.

Figure 2:
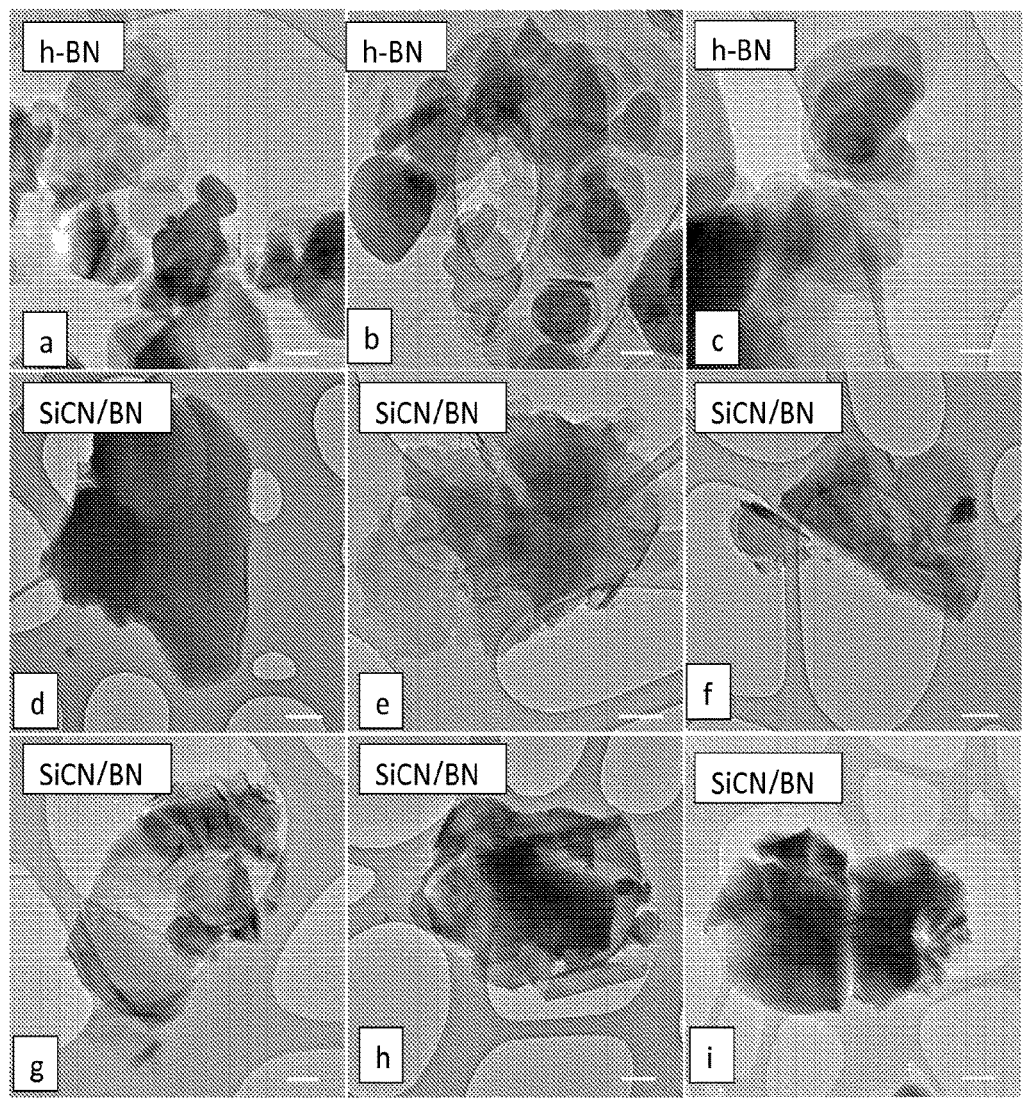
FIG. 2 shows TEM images of: (a-c) as-obtained BN sheets; and (d-i) as-synthesized SiCN/BN composite material.
Figure 3:
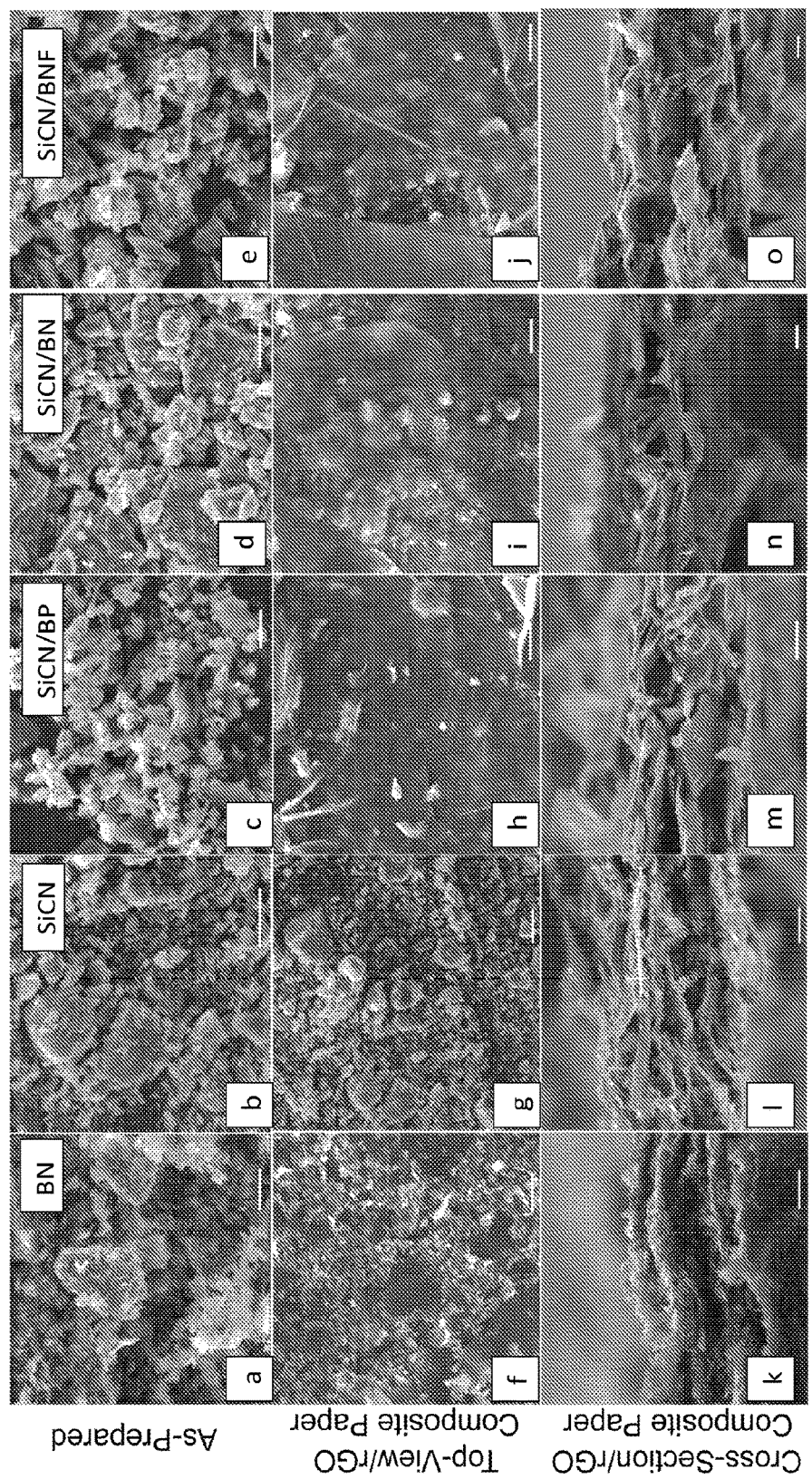
FIG. 3 shows (a-e) SEM images of "as-prepared" BN, SiCN, SiCN/BP, SiCN/BN, and SiCN/BN; (f-j) top-view SEM images of free-standing paper electrode made with approx. 20 wt. % rGO; and (k-o) their corresponding cross-sectional images. The average paper thickness was observed to be 20 µm. Scale bar is 5 µm in all images.

Electron microscopy images of as-obtained h-BN powder and as-synthesized SiCN/BN composite are compared. In FIG. 2, TEM images comparing as-obtained h-BN with SiCN/BN are presented. FIG. 3 shows SEM images of as-obtained h-BN powder and as-synthesized SiCN/BN composite. TEM and SEM images confirmed layered and 'fluffy' structure of as-obtained h-BN while SiCN/BN composite appeared more compact and thicker, although sheets-like morphology of the starting BN was still observable. From the SEM images the average particle size of SiCN/BN was approx. (5 to 10) μm. As-pyrolyzed SiCN and SiCN modified with boron particles (i.e., SiCN/BP) and cross-linked polyborazylene (i.e., SiCN/BNF) appeared more irregular with tiny particles decorating big micrometer size particles as can be seen in FIG. 3 in a side-by-side comparison.

Top-view and cross-section SEM images of various paper electrodes prepared with rGO as conducting support (see methods section for electrode preparation) are also presented in FIG. 3 (e through l) while the freestanding paper electrode with rGO support had a thickness of approx. 40 μm. Closer examination showed the paper to be layered with rGO platelets embedded with SiCN/BN particles which themselves had sheet like morphology.

Chemical bonds present in the composite materials were characterized using Fourier Transform Infrared (FTIR) spectroscopy which showed that SiCN/BN and SiCN/BNF had strong BN bond vibrations with no obvious presence of BO bonding (not shown). The peaks ascribed to vinyl groups are the C—H vibrations at 3047 cm$^{-1}$ and CC stretching at 1591 cm$^{-1}$. The peaks attributed to Si—NH—Si groups are N—H stretching at 3374 cm$^{-1}$ and Si—N vibration at 1160 cm$^{-1}$. Si—CH$_3$ characteristic peaks are at 1253 cm$^{-1}$ and methyl vibrations at 2954 and 2896 cm$^{-1}$. The large peak at 2111 cm$^{-1}$ is attributed to Si—H. The broad band between 640 and 1000 cm$^{-1}$ are resultant to merger of two bonds: Si—C and Si—N. The peaks that cover Si—C, Si—N and C—C at the lower wavenumber range (<1400 cm$^{-1}$) suggesting mixture of bonds.

Further characterization involved XPS analysis of SiCN/BN composite, which revealed distinct peaks from which the elemental composition of the final material was confirmed. The survey scans of SiCN/BN showed the existence of Si, B, N and C elemental peaks arising from the valence energy levels for the respective atoms. The peak at about 190.5 eV for the high resolution B1s and peak at around 285 eV spectrums for C1s confirmed the presence of B—N, Si—C and C—C bonds in the final composite material, respectively. This proves the successful introduction of B into the final ceramic material. The high resolution B1s spectrum of SiCN/BNF was quite different with an emergence of a weak peak at 192.2 eV that was also the only observable peak in SiCN/BP, while the C1s peaks looked similar to SiCN/BN.

Figure 4:
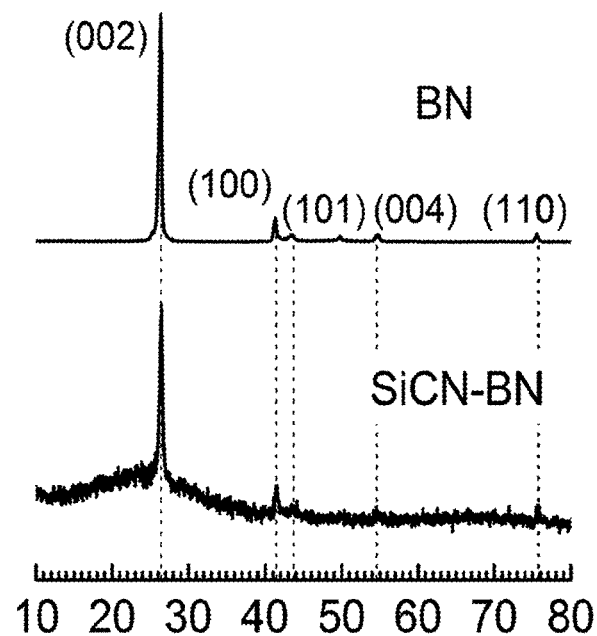
FIG. 4 is a graph of X-ray comparison of 'as-obtained' h-BN powder and SiCN/BN composite. Characteristic BN peaks were clearly observed in the SiCN/BN composite.

Chemical characterization of the hybrid matrix involved X-ray diffraction (XRD) to identify the crystallinity of the composite material. SiCN/BN spectrum was comparable to XRD of as-obtained h-BN powder spectrum as shown in FIG. 4, and also from literature with its characteristic 002 peak at 28° 2θ indicating that the BN sheets was largely intact in the amorphous SiCN ceramic matrix. Very weak but similar spectrum was obtained for SiCN/BNF but SiCN/BP was completely featureless in X-ray. Additional characterization of the composite was carried out by use of solid-state NMR ($^{11}$B). $^{11}$B solid-state MAS NMR spectra of samples SiCN/BN and SiCN/BNF show a main signal in the region of tricoordinated boron atoms that was tentatively simulated with a site at 30 ppm (CQ=3.0 MHz, η=0.2) assigned to B—N bonds in planar BN$_3$ groups within BN graphitic layers. A second small signal at $\delta_{iso}$=0.6 ppm (no quadrupolar shape) is indicative of the presence of tetragonal BO$_4$ groups in minor quantity. The $^{11}$B spectrum of SiCN/BP shows a shapeless signal centered at 4.5 ppm characteristic of amorphous elemental boron in good agreement with XRD results.

To identify the thermal stability of SiCN/BN composite, thermogravimetric analysis (TGA) plots of all materials were compared. SiCN/BN was extremely stable with no significant weight loss even when it was heated to 1000° C. in flowing air however, weight loss was observed for SiCN/BNF, while SiCN/BP had slight weight gain. This could mean that when cross-linked BN (i.e., polyborazylene) precursor is added in the polysilazane polymeric phase, only a fraction of boron in the pyrolyzed ceramic is retained.

Figure 5:
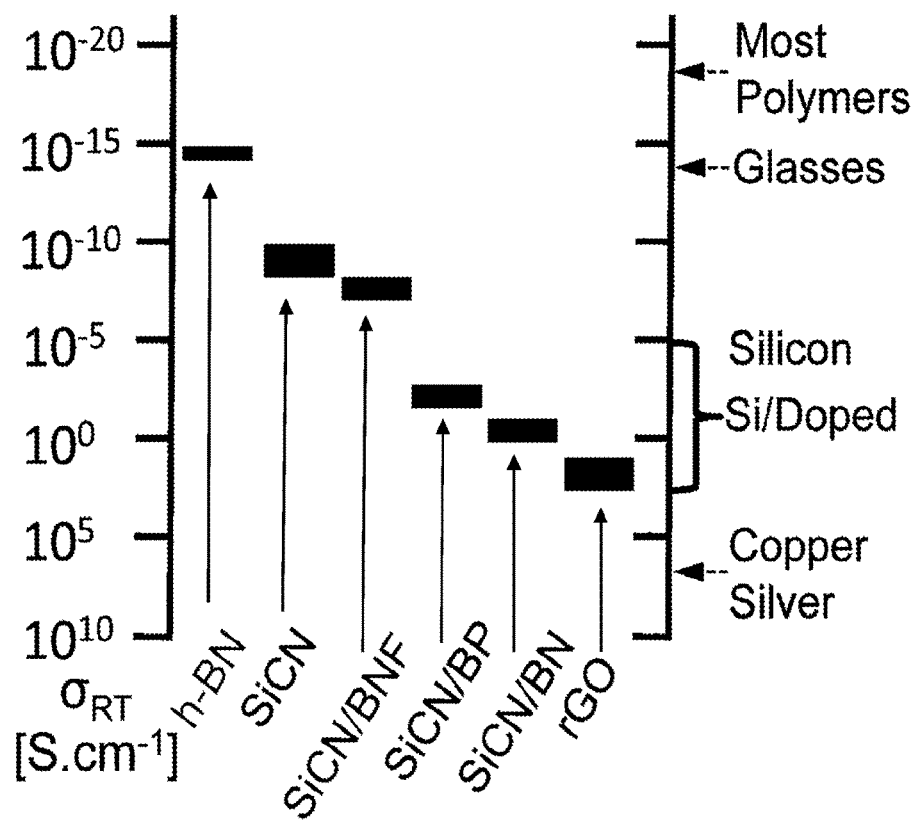
FIG. 5 is a graph of the four point Van der Pauw electrical conductivity comparison of various doped SiCN PDCs prepared in Example 1. rGO and BN have been included to provide a perspective on the wide range in conductivity that can be achieved in these glass-ceramics.

Lastly, four-point surface electrical conductivity of various ceramic specimens was also measured and compared. This data is presented in FIG. 5. It is clear that SiCN/BN had the highest electrical conductive of any the other specimens reaching values as high as doped silicon. SiCN/BP had the next highest electrical conductivity.

Electrochemical Cycling Results of RGO Supported Paper Electrodes

Figure 6:
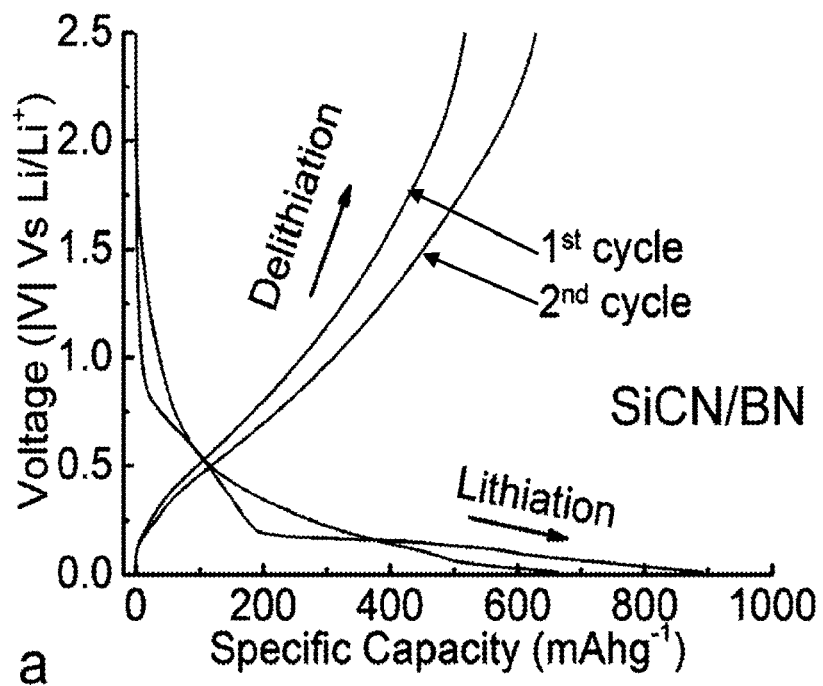
FIG. 6 shows graphs of 1st and 2nd cycle (a) voltage profile and (b) differential capacity curve of SiCN/BN/rGO composite anode. (c) Charge capacity of SiCN/BN/rGO along with rGO, BN/rGO and SiCN/rGO anodes for comparison. Cells were cycled asymmetrically at different rates for every 5 cycles; (d) Consecutively cycled symmetrically at 1600 mA g–1 for 1000 cycles along with their cyclic efficiencies.
Figure 6:
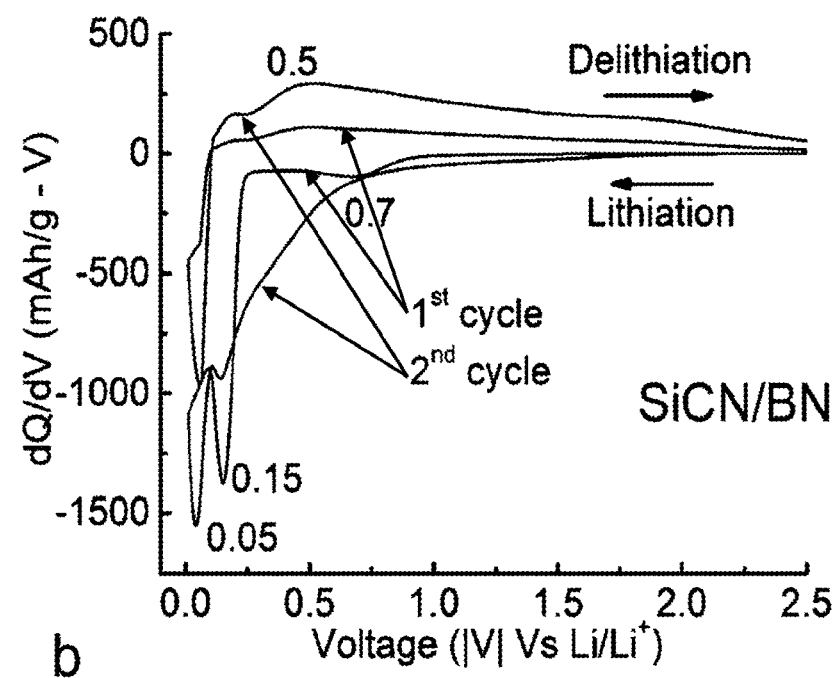
Figure 6:
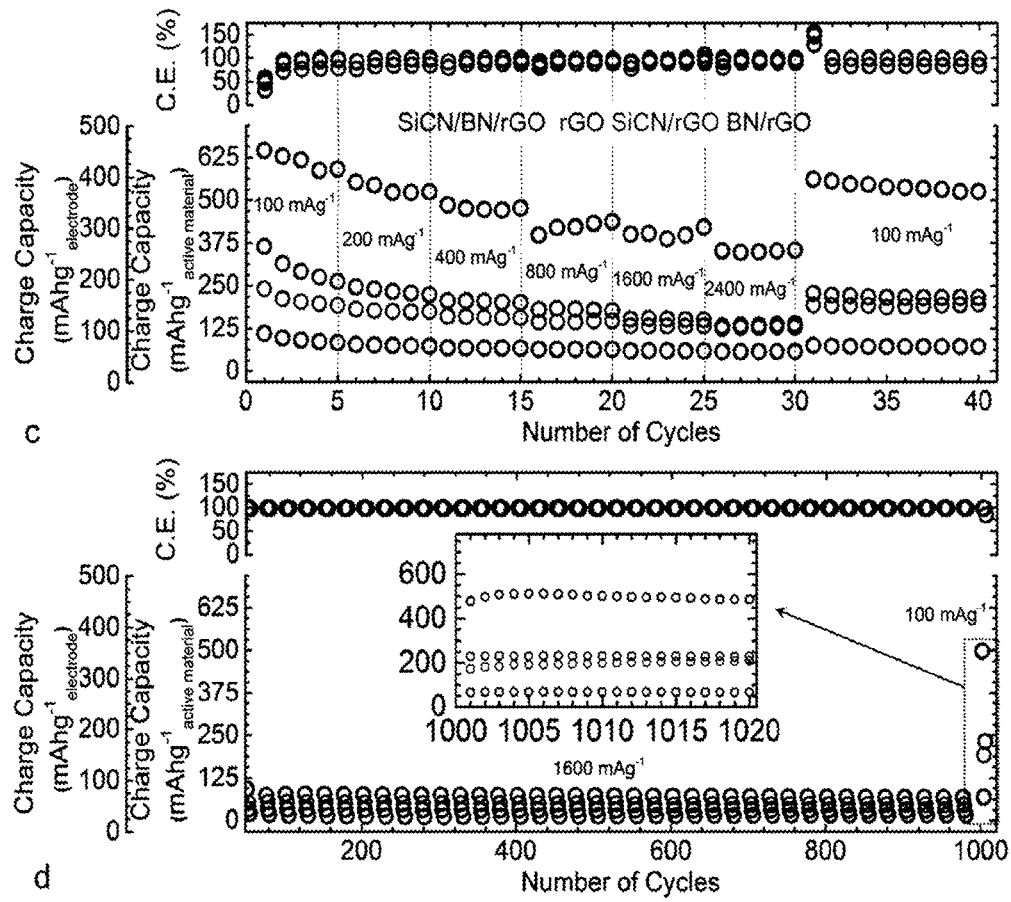

Electrochemical behavior of the SiCN/BN/rGO freestanding paper anode (with approx. 20 wt. % rGO as conducting agent and mechanical support) was studied by cycling it in a half cell configuration against pure lithium metal. FIG. 6 (a and b) shows the charge/discharge profile and differential capacity curves of first two cycles for the SiCN/BN electrode. First cycle discharge and charge capacity were observed to be 890 and 520 mAh g$^{-1}$ with a first cycle loss of 58%. Which is among the highest reported for polysilazane based anode materials (Table 1).

TABLE 1

Summary of the electrochemical cycling data for various electrodes used in this study.

| Electrode Material | 1$^{st}$ cycle Discharge, mAh g$^{-1}$ | 1$^{st}$ cycle Charge, mAh g$^{-1}$ | 1$^{st}$ cycle Efficiency, % | Charge Capacity at 2400 mA g$^{-1}$ | Charge Capacity after 1000 cycles at 100 mA g$^{-1}$ |
|---|---|---|---|---|---|
| SiCN/BN/rGO | 891 | 517 | 58 | 283 | 401 |
| SiCN/BNF/rGO | 531 | 262 | 49 | 101 | 202 |
| SiCN/BP/rGO | 346 | 140 | 40 | 69 | 95 |
| rGO | 912 | 291 | 32 | 111 | 184 |
| SiCN/rGO | 351 | 192 | 55 | 102 | 159 |
| BN/rGO | 185 | 89 | 48 | 46 | 55 |
| BP/rGO | 221 | 99 | 45 | 55 | 68 |

NOTE:
All electrodes were freestanding papers with approx. 20 wt % rGO in them.

Figure 7:
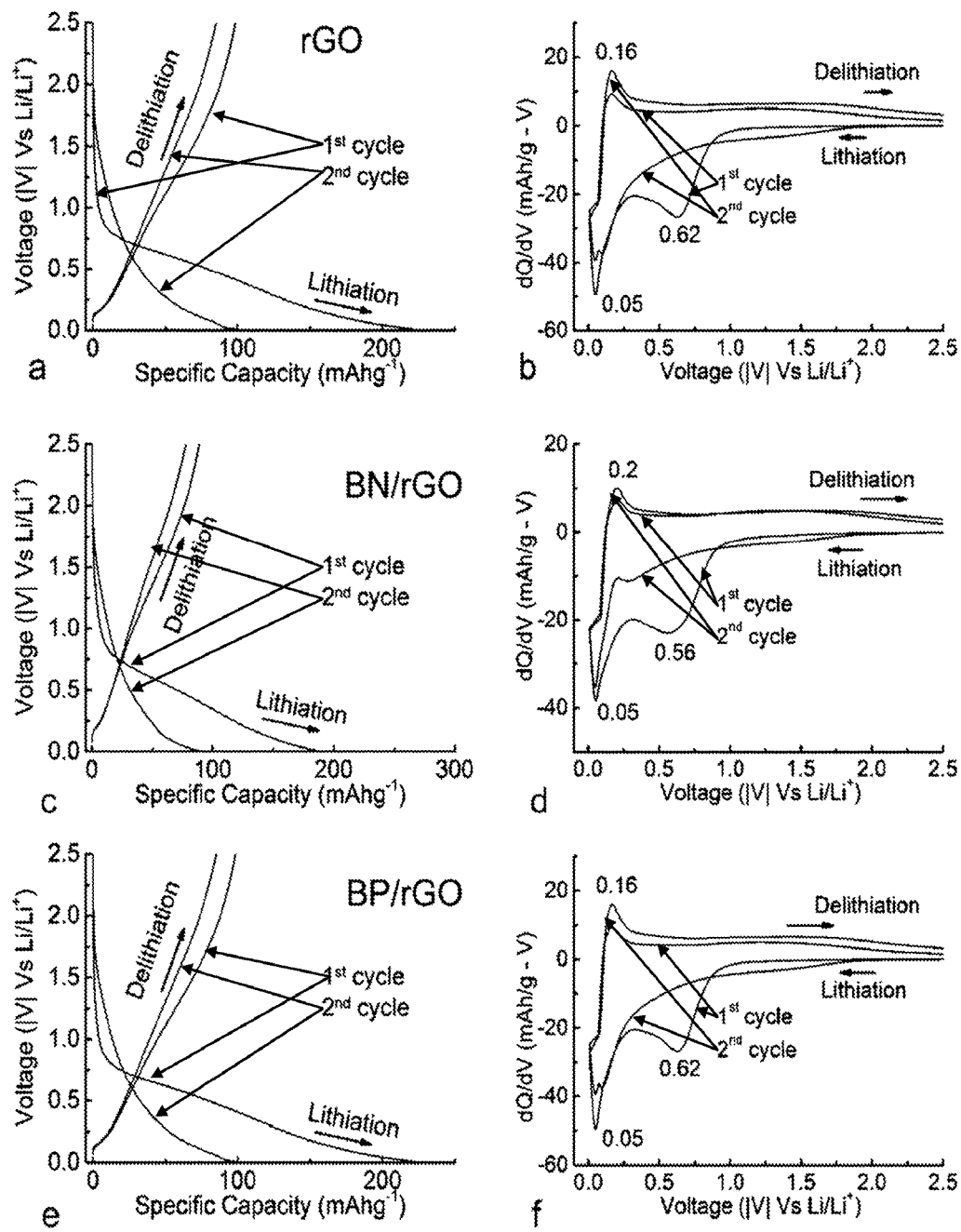
FIG. 7 shows graphs of 1st and 2nd cycle (a) voltage profile of 100% rGO and (b) differential capacity curve of 100% rGO; (c) voltage profile of BN/rGO and (d) differential capacity curve of BN/rGO; and (e) voltage profile of BP/rGO anode; and (f) differential capacity curve of BP/rGO anode.
Figure 8:
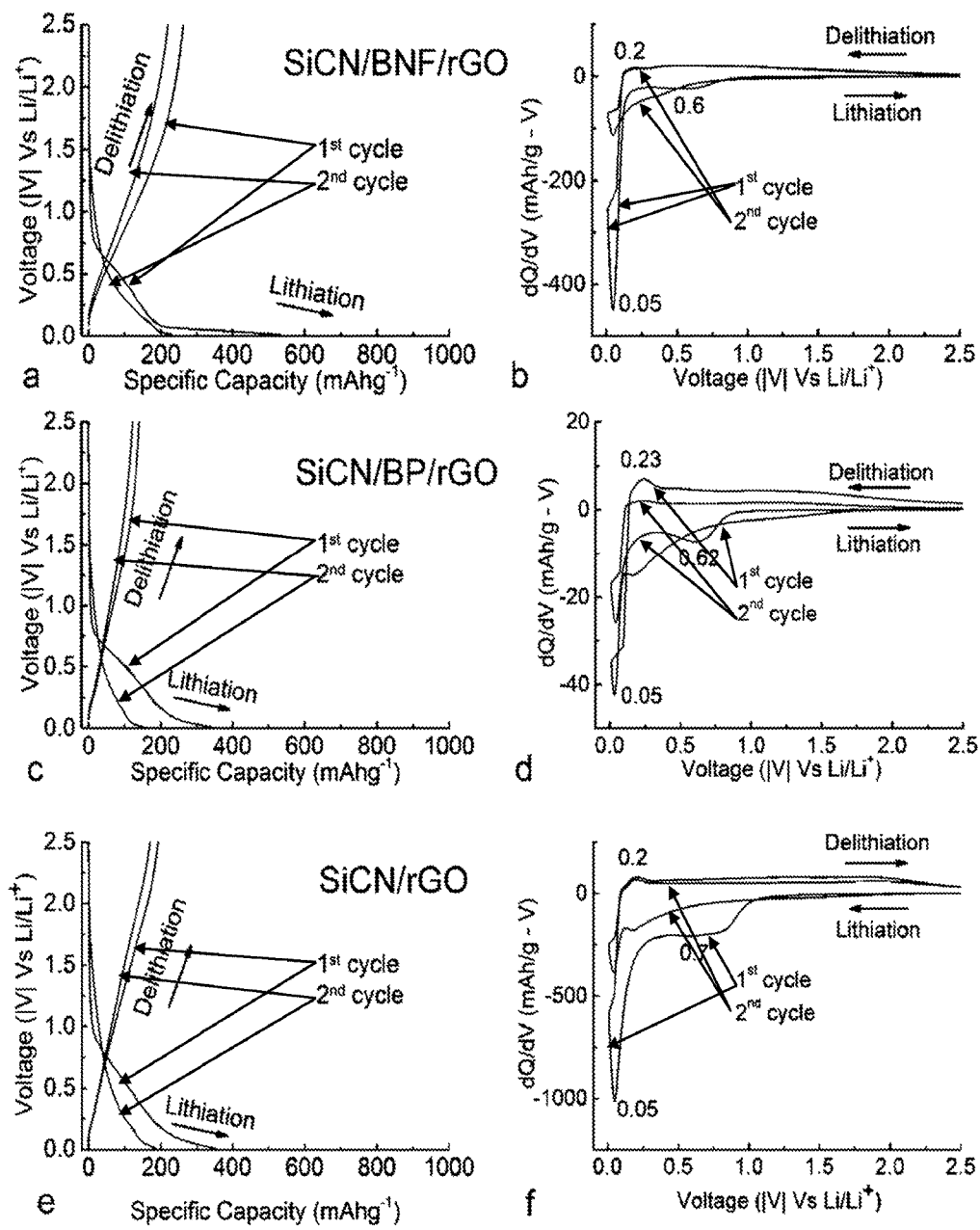
FIG. 8 shows graphs of 1st and 2nd cycle (a) voltage profile of SiCN/BNF/rGO and (b) differential capacity curve of SiCN/BNF/rGO; (c) voltage profile of SiCN/BP/rGO and (d) differential capacity curve of SiCN/BP/rGO; and (e) voltage profile of SiCN/rGO anode; and (f) differential capacity curve of SiCN/rGO anode.

For example, first reversible capacity of SiCN/BN hybrid composite is better than SiCN-1300° C. (383 mAh g$^{-1}$), SiCN treated at 1000° C. (456 mAh g$^{-1}$), Si(B)CN (~100 mAh g$^{-1}$) and C-rich SiCN (~263 mAh g$^{-1}$) or PDC-composites like Si(B)CN/CNT (~450 mAh g$^{-1}$), SiCN/graphite (~474 mAh g$^{-1}$). Further, the differential capacity curve showed first cycle lithiation peaks at 50 mV, 150 mV, and a weak plateau at ~700 mV and delithiation plateau at ~500 mV. From literature, the peak at 50 mV could be attributed to Li intercalation in graphitic carbon and the peak at 150 mV corresponds to interaction of Li in nanovoids or interaction with dangling bonds present at Si and C sites in the ceramic. While the plateau at ~700 to 800 mV was only present in the first cycle which would unmistakably originate due to formation of passive solid electrolyte interface (SEI) on graphite and was common to all electrodes including 'neat' rGO electrode. FIG. 7 shows voltage profiles of 'neat' rGO, BP/rGO, and BN/rGO electrodes. The charge/discharge profile and corresponding differential capacity curves of SiCN/BNF/rGO and SiCN/BP/rGO paper electrodes are shown in FIG. 8. The lithiation peaks were at 50 mV and ~600 mV with corresponding delithiation peak at 200 mV which is very similar to BN/rGO and BP/rGO differential capacity curves. The SiCN/rGO anode performed poorly and the cycling was stopped after two cycles. From these results we deduce that the capacity in SiCN/BN originates primarily from BN enhanced SiCN based Li intercalation sites while it is not the same in other ceramics that we tested. This is even more evident from the first cycle discharge capacities which were at ~550 mAh g$^{-1}$ and 350 mAh g$^{-1}$ for SiCN/BNF/rGO and SiCN/BP/rGO, respectively with even lesser capacities in the subsequent cycle considering the fact that BN and boron particles have zero or negligible Li cyclability.

Figure 9:
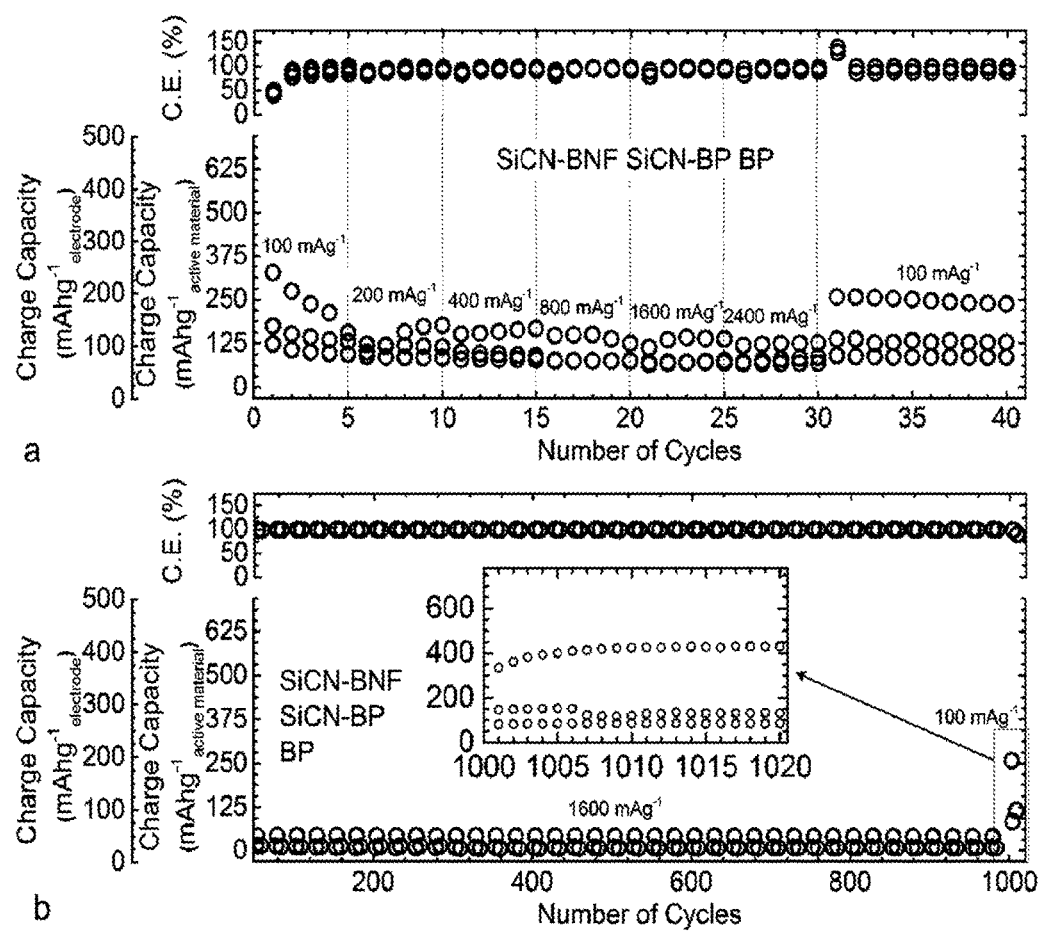
FIG. 9 shows graphs of the charge capacity of SiCN—BNF/rGO, SiCN/BP/rGO and BP/rGO anodes (a) asymmetrically cycled at different rates for every 5 cycles and (b) consecutively cycled symmetrically at 1600 mA g$^{-1}$ for 1000 cycles along with their cyclic efficiencies w.r.t. weight of the active material and total weight of the electrode.

On further cycling (FIG. 6c), SiCN/BN/rGO maintained its high capacity at 500 mAh g$^{-1}$ (96% of the initial capacity retained) which is relatively higher when compared to rGO, BN/rGO and SiCN/rGO with charge capacities of 292, 75 and 192 mAh g$^{-1}$, respectively after 5 cycles at 100 mA g$^{-1}$. The current density was gradually increased to 200, 400, 800, 1600 and 2400 mA g$^{-1}$ for each 5 cycles consecutively. Impressively, SiCN/BN/rGO hybrid composite maintained its reversible capacity of 283 mAh g$^{-1}$ even at 2400 mA g$^{-1}$ which was 52% of the initial capacity. When the cells were cycled back at 100 A g$^{-1}$ all the cells regained their initial charge capacities at 440, 130, 175, 58 and 150 mAh g$^{-1}$ for SiCN/BN/rGO, rGO, BN/rGO and SiCN/rGO, respectively. The charge capacity was substantially higher when compared to other PDC-based anodes and even boron doped PDCs or PDC-CNT composites. Most importantly, very few PDC-based anodes have been shown to function let alone perform exceedingly well at this high current density. On the other hand performance of SiCN/BNF/rGO, SiCN/BP/rGO, and BP/rGO were extremely lower than SiCN/BN/rGO. To test cell performance during long term cycling the cells were cycled at 1600 mA g$^{-1}$ during both charge and discharge half cycles (FIG. 6d). SiCN/BN/rGO had an impressively stable and high charge capacity of ~77 mAh·g$^{-1}$ than 100% rGO, BN/rGO and SiCN/rGO anode at ~18, 25 and 40 mAh g$^{-1}$, respectively. All the cells regained most of their initial capacity when they were cycled at a current density of 100 mA g$^{-1}$ after 1000 cycles. SiCN/BN/rGO was the best performing anode that had a charge capacity of 410 mAh g$^{-1}$ at 100 mA g$^{-1}$ even after 1000 cycles at 1600 mA g$^{-1}$ during both discharge and charge half cycles. FIG. 9 shows the cycling data and charge capacity for SiCN/BNF/rGO, SiCN/BP/rGO AND BP/rGO.

The high charge capacity of SiCN/BN is attributed to the three-fold advantage in adding boron to SiCN matrix in the form of BN sheets. (1) Possible neutralization of nitrogen atoms by boron. SiCN electrodes with higher nitrogen content generally shows lower electrochemical performance, thus, it is possible that increasing concentration of boron in SiCN neutralized some of the nitrogen dangling bonds in SiCN during the pyrolysis process, (2) improved porosity and high surface area of the electrode due to sheet like morphology, and (3) significant enhancement in electrical conductivity of the SiCN/BN hybrid ceramic matrix when compared to any other PDC material pyrolyzed under similar conditions.

Conclusion

In conclusion, we demonstrated the synthesis of SiCN functionalized BN nanocomposite and also studied its thermal stability and electrochemical behavior. SEM and TEM characterized the morphology of the particle to be sheet like with 5-10 μm in size and the SAED pattern confirmed embedded nature of BN sheets in SiCN composite matrix. Other methods of boron doping of SiCN like using boron powder (BP) and polymeric BN (BNF) were also synthesized and characterized. The chemical composition of the materials were characterized using XPS, NMR and FTIR. TGA showed the incredible thermal stability of the synthesized SiCN/BN ceramic when compared to other ceramics. When used as paper electrodes with approx. 20 wt. % rGO as the conducting agent, SiCN/BN showed three fold improvement in cyclic performance when compared to SiCN, SiCN/BP and SiCN/BNF. SiCN/BN had an impressive first cycle capacity of ~650 mAh eat 100 mA $g^{-1}$ and ~375 mAh $g^{-1}$ at 2400 mA $g^{-1}$. The anode remained intact even after being cycled for 1000 cycles at 1600 mA $g^{-1}$ and impressively regained most of its capacity when cycled back at 100 mA $g^{-1}$.

Example 2

In this Example, the laser irradiance behavior and resulting structural evolution of SiCN/BN coatings was examined. A SiCN/BN composite composition was prepared and spray-coated onto copper substrates. The spraying was done with longitudinal passes while the substrate surface temperature was raised to 80° C. using a hot plate. Frequent stops between the passes allowed the solvent to evaporate and thereby form a uniform compact coating. Spray coating was carried out until the appropriate dark black coating thickness was visually realized with an approximate thickness of 10 nm. The coated copper test specimens were then maintained at 100° C. on a hot plate for 12 hours to ensure removal of volatile entities. The substrate was a circular copper disc (weighing about 20 grams) with about 26 mm diameter and about 13 mm thickness.

Figure 10:
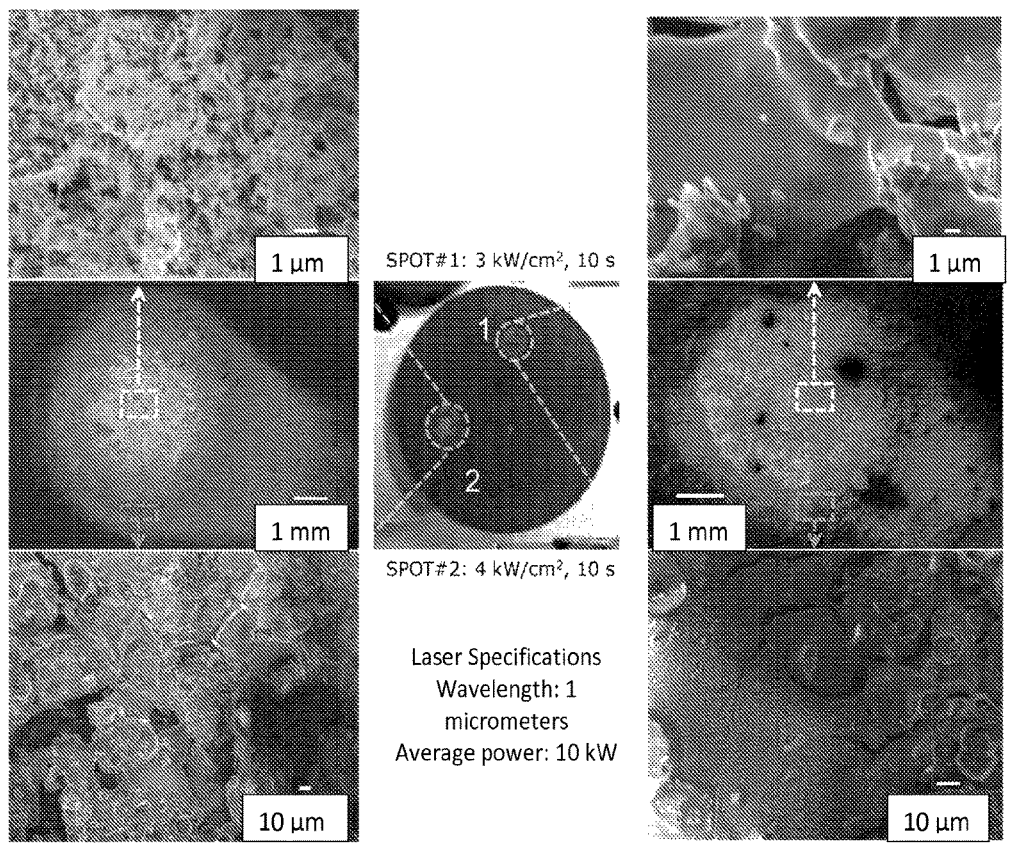
FIG. 10 shows digital camera and EM images of a SiCN/BN composite-coated copper disc that has been exposed to laser irradiation from Example 2.

The coated discs were exposed to laser irradiation at 3 $kWcm^{-2}$ or 4 $kWcm^{-2}$ for 10 seconds at 10 kW average power. The exposed and unexposed areas of the coatings were analyzed and compared using electron microscopy (EM) and digital imagery. The results are shown in FIG. 10. The center image is a digital camera photograph of SiCN/BN composite coated copper disc exposed to laser irradiation in two different spots. Spot #1 received 3 $kWcm^{-2}$ while Spot #2 received 4 $kWcm^{-2}$. The left hand images show Electron microscope (EM) images of Spot #1 at varying magnification levels. The right hand images show Electron microscope (EM) images of Spot #2. No burning was observed and the copper disc surface remained unexposed. Microcracks in the coating appearance are due to localized melting of copper underneath and thermal expansion mismatch with the coating (not to coating damage).

What is claimed:

1. A ceramic composite comprising a matrix of a polymer-derived ceramic and hexagonal boron nitride nanosheets embedded therein, wherein said polymer-derived ceramic is selected from the group consisting of SiCN, SiOC, and combinations thereof.

2. The ceramic composite of claim 1, wherein said ceramic composite is in the form of discrete particulates, each of said particulates comprising said matrix of polymer-derived ceramic and hexagonal boron nitride nanosheets.

3. The ceramic composite of claim 2, wherein said ceramic composite herein said composite is a free-flowing powder that is substantially free of solvents.

4. The ceramic composite of claim 2, wherein said particulates have a sheet-like morphology with at least one planar dimension.

5. The ceramic composite of claim 1, wherein said ceramic composite is substantially free of fillers selected from the group consisting of carbon nanotubes, nanoparticles, carbon fibers, graphene, molybdenum disulfide, fullerenes, and combinations thereof.

6. The ceramic composite of claim 1, wherein the weight ratio of polymer-derived ceramic to hexagonal boron nitride nanosheets in said matrix is from about 10:90 to about 90:10.

7. A structure comprising:
a substrate having a surface; and
a layer of a polymer-derived ceramic composite according to claim 1, adjacent said substrate surface.

8. The structure of claim 7, wherein said layer is resistant to laser irradiation up to about 4 $kWcm^{-2}$ at a wavelength of about 1.0 μm at 10 kW average power, for about 10 seconds without burning, delamination, or deformation of said layer.

9. The structure of claim 7, wherein said substrate is selected from the group consisting of metallic surfaces, natural woven fibers, synthetic woven fibers, natural non-woven fibers, synthetic nonwoven fibers, natural or synthetic mats, natural or synthetic cloth, and combinations thereof.

10. The structure of claim 7, wherein said substrate is an article of manufacture selected from the group consisting of high temperature sensors, turbine blades, engine parts, microelectronic components, solar cells, electrodes, protective coatings, tubing, wires, pump shafts, cylinders, spindles or sleeves, induction coils, and combinations thereof.

11. A method of forming a polymer-derived ceramic, said method comprising:
providing a functionalized precursor compound mixture comprising a liquid-phase, silicon-based ceramic precursor compound and hexagonal boron nitride nanosheets;
crosslinking said functionalized precursor compound to yield a pre-ceramic composite comprising a cross-linked matrix of said silicon-based ceramic precursor compound and hexagonal boron nitride nanosheets; and
converting said silicon-based ceramic precursor compound to ceramic to yield a ceramic composite comprising a polymer-derived ceramic matrix and hexagonal boron nitride nanosheets embedded therein.

12. The method of claim 11, wherein said silicon-based ceramic precursor compound is selected from the group consisting polysilazane, polysiloxane, and combinations thereof.

13. The method of claim 11, wherein said polymer-derived ceramic is selected from the group consisting of SiCN, SiOC, and combinations thereof.

14. The method of claim 11, wherein said converting comprises pyrolyzing said crosslinked matrix of said silicon-based ceramic precursor compound and hexagonal boron nitride nanosheets.

15. The method of claim 11, wherein said functionalized precursor compound mixture is substantially free of fillers selected from the group consisting of carbon nanotubes, nanoparticles, carbon fibers, graphene, molybdenum disulfide, fullerenes, and combinations thereof.

16. The method of claim 11, wherein said liquid-phase, silicon-based ceramic precursor compound and hexagonal boron nitride nanosheets are non-covalently bonded in said functionalized precursor compound mixture.

17. The method of claim 11, further comprising providing a mold and filling said mold with said functionalized precursor compound mixture prior to said crosslinking.

18. A powdered composition comprising a plurality of free-flowing particulates, each of said particulates consisting of ceramic composites comprising a matrix of polymer-derived ceramic and hexagonal boron nitride nanosheets embedded therein, wherein said polymer-derived ceramic is SiCN, said powdered composition having a four-point electrical conductivity of at least 0.115 S/cm.

* * * * *